United States Patent
Chang et al.

(10) Patent No.: US 10,817,213 B2
(45) Date of Patent: Oct. 27, 2020

(54) DATA STORAGE DEVICE AND OPERATING METHOD FOR DATA STORAGE DEVICE

(71) Applicant: Silicon Motion, Inc., Jhubei, Hsinchu County (TW)

(72) Inventors: Ming-Hung Chang, Zhubei (TW); Kuo-Yuan Hsu, Zhubei (TW)

(73) Assignee: SILICON MOTION, INC., Jhubei, Hsinchu County (TW)

( * ) Notice: Subject to any disclaimer, the term of this patent is extended or adjusted under 35 U.S.C. 154(b) by 359 days.

(21) Appl. No.: 15/858,066

(22) Filed: Dec. 29, 2017

(65) Prior Publication Data
US 2018/0253259 A1 Sep. 6, 2018

(30) Foreign Application Priority Data
Mar. 6, 2017 (TW) .............................. 106107176 A (51) Int. Cl.
*G06F 12/00* (2006.01)
*G06F 3/06* (2006.01)

(52) U.S. Cl.
CPC ............ *G06F 3/0658* (2013.01); *G06F 3/061* (2013.01); *G06F 3/0604* (2013.01); *G06F 3/0659* (2013.01); *G06F 3/0679* (2013.01)

(58) Field of Classification Search
None
See application file for complete search history.

(56) References Cited

U.S. PATENT DOCUMENTS

| | | | | |
|---|---|---|---|---|
| 7,421,573 B2 * | 9/2008 | Kim | ........................ | G06F 8/65 711/100 |
| 8,028,155 B1 * | 9/2011 | Righi | .................... | G06F 9/4406 713/1 |
| 8,555,048 B2 * | 10/2013 | Goldstein | ............. | G06F 9/4405 709/222 |
| 2003/0204603 A1 * | 10/2003 | Buchanan | ............... | H04L 29/06 709/228 |
| 2006/0174055 A1 * | 8/2006 | Flynn | .................... | G06F 9/4406 711/100 |
| 2009/0187745 A1 * | 7/2009 | Hino | ........................ | G06F 8/60 712/220 |

(Continued)

FOREIGN PATENT DOCUMENTS

TW I418991 B 12/2013
TW I562068 B 12/2016

(Continued)

*Primary Examiner* — Jason W Blust
(74) *Attorney, Agent, or Firm* — McClure, Qualey & Rodack, LLP (57) ABSTRACT

A data storage device in a two-layer control structure is provided. A control unit of the data storage device has a command processor and a first non-volatile memory (NVM) controller. The command processor is operative to communicate with a host. The first non-volatile memory (NVM) controller operates a first NVM of the data storage device. Earlier than the command processor operates according to a ROM image corresponding to the command processor, the first NVM controller operates according to a ROM image corresponding to the first NVM controller to access the first NVM to get a firmware image for the command processor and loads the command processor with the firmware image.

23 Claims, 7 Drawing Sheets

(56) References Cited

U.S. PATENT DOCUMENTS

| | | | | |
|---|---|---|---|---|
| 2010/0077066 A1* | 3/2010 | Chawla | ............... | G06F 9/4416 |
| | | | | 709/222 |
| 2011/0197055 A1* | 8/2011 | Spottswood | ......... | G06F 9/4401 |
| | | | | 713/2 |
| 2013/0268746 A1* | 10/2013 | Hsu | ...................... | G06F 21/572 |
| | | | | 713/2 |
| 2015/0242128 A1* | 8/2015 | Margalit | ............... | G06F 3/0608 |
| | | | | 711/103 |
| 2015/0286421 A1* | 10/2015 | Chen | ................... | G06F 3/0617 |
| | | | | 714/764 |

FOREIGN PATENT DOCUMENTS

| | | | |
|---|---|---|---|
| TW | I564801 B | 1/2017 | |
| TW | I564802 B | 1/2017 | |

\* cited by examiner

DATA STORAGE DEVICE AND OPERATING METHOD FOR DATA STORAGE DEVICE

CROSS REFERENCE TO RELATED APPLICATIONS

This Application claims priority of Taiwan Patent Application No. 106107176, filed on Mar. 6, 2017, the entirety of which is incorporated by reference herein.

BACKGROUND OF THE INVENTION

Field of the Invention

The present invention relates to data storage devices.

Description of the Related Art

There are various forms of nonvolatile memory used in data storage devices for long-term data retention, such as flash memory, magnetoresistive RAM, ferroelectric RAM, resistive RAM, spin transfer torque-RAM (STT-RAM), and so on.

How to improve the operational efficiency of a data storage device is an important issue in this area of technology.

BRIEF SUMMARY OF THE INVENTION

A data storage device in accordance with an exemplary embodiment of the disclosure includes a first nonvolatile memory and a control unit in a two-layer control structure. The control unit uses a command processor to communicate with a host and uses a first nonvolatile memory controller to operate the first nonvolatile memory. Earlier than the command processor operates according to a read-only-memory (ROM) code image corresponding to the command processor, the first nonvolatile memory controller operates according to a ROM image corresponding to the first nonvolatile memory controller to access the first nonvolatile memory for a firmware image corresponding to the command processor and transmit the firmware image corresponding to the command processor to the command processor.

In another exemplary embodiment, a method for operating a data storage device is provided, by which a command processor is provided to communicate with a host and a first nonvolatile memory controller is provided to operate a first nonvolatile memory. Earlier than the command processor operates according to a read-only-memory (ROM) code image corresponding to the command processor, the first nonvolatile memory controller operates according to a ROM image corresponding to the first nonvolatile memory controller to access the first nonvolatile memory for a firmware image corresponding to the command processor and transmit the firmware image corresponding to the command processor to the command processor.

The firmware images of the different processors (including the command processor and the first nonvolatile memory controller) are stored within one single nonvolatile memory for easy management.

A data storage device in accordance with another exemplary embodiment of the disclosure comprises a nonvolatile memory, a command processor, and a nonvolatile memory controller. The command processor communicates with a host. The nonvolatile memory controller operates the nonvolatile memory according to instructions from the command processor. The command processor operates according to a firmware image provided from the nonvolatile memory controller rather than according to a ROM image.

A data storage device in accordance with another exemplary embodiment of the disclosure comprises a nonvolatile memory, a command processor, and a nonvolatile memory controller. The command processor communicates with a host. The nonvolatile memory controller operates the nonvolatile memory according to instructions from the command processor. Before receiving the instructions, the nonvolatile memory controller automatically provides the command processor with a firmware image retrieved from the nonvolatile memory.

A data storage device in accordance with another exemplary embodiment of the disclosure comprises a nonvolatile memory, a command processor and a nonvolatile memory controller. The command processor communicates with a host. The nonvolatile memory controller operates the nonvolatile memory according to instructions from the command processor. The nonvolatile memory controller operates according to a ROM image to get a firmware image from the nonvolatile memory and loads the command processor with the firmware image.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein:

FIG. 3A to FIG. 3C are timing diagrams to help understand the booting scheme of FIG. 2;

DETAILED DESCRIPTION OF THE INVENTION

The following description shows exemplary embodiments of carrying out the invention. This description is made for the purpose of illustrating the general principles of the invention and should not be taken in a limiting sense. The scope of the invention is best determined by reference to the appended claims.

To implement a data storage device, a nonvolatile memory, such as flash memory, a magnetoresistive RAM, a ferroelectric RAM, a resistive RAM, a spin transfer torque-RAM (STT-RAM), or the like, is introduced for long-term data retention. To improve the throughput between a host and a data storage device, a two-layer control structure is introduced to implement a control unit of a data storage device.

Figure 1:
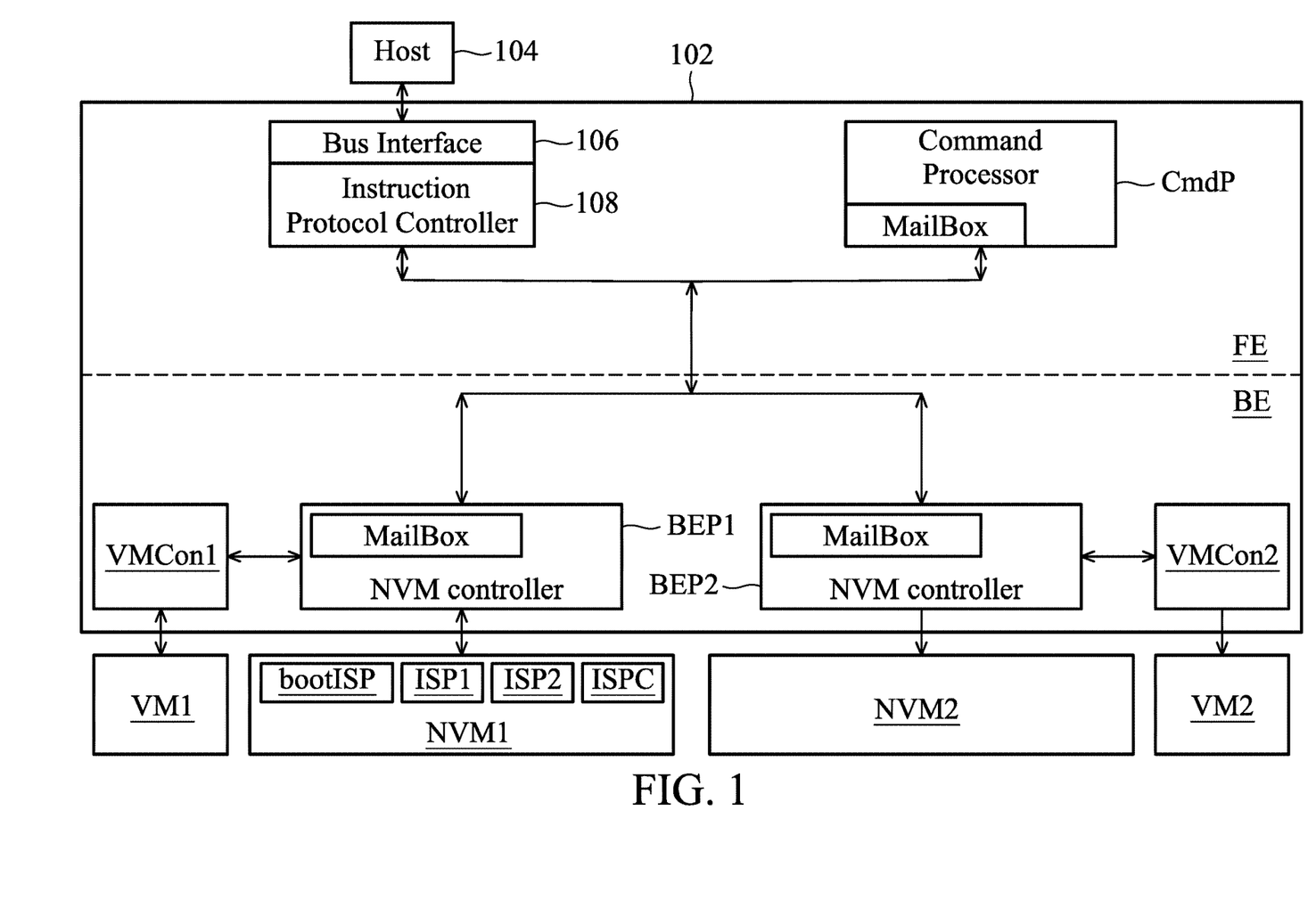
FIG. 1 depicts a data storage device in accordance with an exemplary embodiment of the disclosure.

FIG. 1 depicts a data storage device in accordance with an exemplary embodiment of the disclosure, which includes a control unit 102 and nonvolatile memories NVM1 and NVM2. The exemplary embodiment of FIG. 1 further includes volatile areas (e.g. volatile memories, abbreviated to VM, such as VM1 and VM2 shown in FIG. 1) for temporary storage of data required in the operations of the nonvolatile memories NVM1 and NVM2. The volatile memories VM1 and VM2 may be built-in or external to the control unit 102. The control unit 102 is further divided into two parts: one at the front end FE and another at the back end BE. The part at the front end FE is responsible for communication between the data storage device and a host 104. The part at the back end BE is responsible for operating the nonvolatile memories NVM1 and NVM2. According to such a two-layer control structure, communication between the host 104 and the data storage device is specifically managed at the front end FE. Thus, the throughput between the host 104 and the data storage device is considerably improved. The complexity of debugging is also reduced, no matter whether it is at the front end FE or at the back end BE.

As shown, the host 104 is connected to the data storage device via a bus interface 106. The instructions issued from the host 104 are transmitted to a command processor Cmdp by an instruction protocol controller 108 to be scheduled and then transmitted to the back end BE. In an exemplary embodiment, the bus interface 106 is a PCIE interface. The instruction protocol controller 108 may support an NVMe instruction protocol, an ATA (advanced technology attachment) instruction protocol, a PATA (parallel ATA) instruction protocol, a SATA (serial ATA) instruction protocol, or an SCSI (small computer system interface).

In the data storage device, the nonvolatile memories NVM1 and NVM2 are in the same size or in a specific ratio. As shown, corresponding to the nonvolatile memories NVM1 and NVM2, nonvolatile memory controllers BEP1 and BEP2 and volatile memory controllers VMCon1 and VMCon2 are further provided in addition to the volatile memories VM1 and VM2. Read/write instructions are transmitted from the front end FE to the back end BE to be processed by the components at the back end BE. As shown, the nonvolatile memory controllers BEP1 and BEP2 operate the volatile memory controllers VMCon1 and VMCon2 to operate the volatile memories VM1 and VM2 to temporarily store the instructions that the nonvolatile memory controllers BEP1 and BEP2 receive. At appropriate time points, the nonvolatile memory controllers BEP1 and BEP2 read/write the nonvolatile memories NVM1 and NVM2 to complete the instructions. The exemplary embodiment of FIG. 1 uses two nonvolatile memories NVM1 and NVM2 to support that high throughput is feasible. In other exemplary embodiments, more nonvolatile memories are used. Or, a single nonvolatile memory providing large storage space is also feasible. In an exemplary embodiment, the nonvolatile memories NVM1 and NVM2 are flash memories. The volatile memories VM1 and VM2 are DRAMs.

The control unit 102 in a two-layer control structure uses multiple processors, including the command processor CmdP and the nonvolatile memory controllers BEP1 and BEP2. The different processors may communicate with each other according to a multi-processor communication mechanism (for example, a mailbox mechanism) to coordinate the operations between the different processors. As shown, the nonvolatile memory controllers BEP1 and BEP2 and the command processor CmdP each includes a mailbox and thereby the operations therebetween are coordinated.

For synchronized firmware versions of the different processors (including the command processor CmdP and the nonvolatile memory controllers BEP1 and BEP2), the firmware images of the different processors may be all stored in the nonvolatile memory NVM1. The nonvolatile memory controller BEP1 performs a booting/initialization procedure (earlier than the command processor CmdP and the nonvolatile memory controller BEP2 operate) to read the firmware images from the nonvolatile memory NVM1 and transmit the firmware images to the correct processors.

As shown in FIG. 1, the nonvolatile memory NVM1 store a booting image bootISP, a firmware image ISP1 for the nonvolatile memory controller BEP1, a firmware image ISP2 for the nonvolatile memory controller BEP2, and a firmware image ISPC for the command processor CmdP. The booting image bootISP may be stored at a predefined address, e.g., stored in a starting block which is a block at the lowest address. After being loaded with and operating according to the booting image bootISP, the nonvolatile memory controller BEP1 correctly reads the firmware images ISP1, ISP2 and ISPC from the nonvolatile memory NVM1. The nonvolatile memory controller BEP1 operates according to the firmware image ISP1, and further transmits the firmware images ISP2 and ISPC to the nonvolatile memory controller BEP2 and the command processor CmdP, respectively, and, accordingly, the nonvolatile memory controller BEP2 and the command processor CmdP operate. In an exemplary embodiment, the physical structure of the nonvolatile memory NVM1 is identical to the physical structure of the nonvolatile memory NVM2, and a common firmware image (rather than the two distinct firmware images ISP1 and ISP2 as shown) is stored in the nonvolatile memory NVM1 for the nonvolatile memories NVM1 and NVM2 both.

Figure 2:
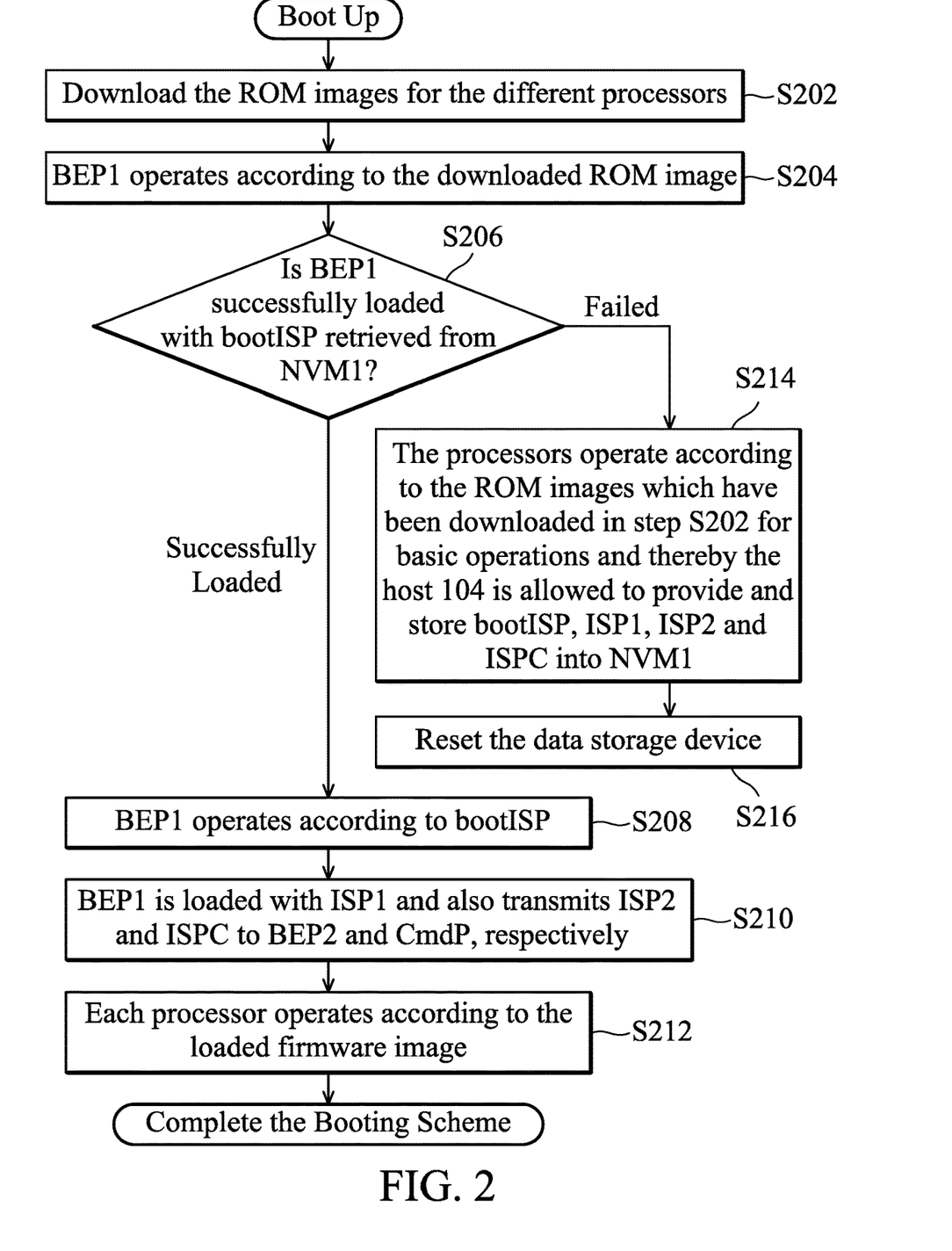
FIG. 2 is a flowchart depicting a booting scheme for the disclosed data storage device.

FIG. 2 is a flowchart depicting a booting scheme for the disclosed data storage device. Each processor (the command processor CmdP, the nonvolatile memory controller BEP1 or the nonvolatile memory controller BEP2) may include a built-in or external space for temporary storage of instructions. The temporary storage space may be provided by an SRAM or a TCM (tightly coupled memory). When booting up the data storage device, the ROM images for the different processors (including the command processor CmdP and the nonvolatile memory controllers BEP1 and BEP2) are first downloaded in step S202. At this time point, the nonvolatile memory controller BEP1 operates in a ROM mode. The ROM images may be downloaded by a boot loader (as known as a ROM loader). The downloading for the ROM images may include steps for integrity checking, decompression, and so on. In step S204, only the nonvolatile memory controller BEP1 operates according to the downloaded ROM image. To guarantee only the nonvolatile memory controller BEP1 operates in step S204, the command processor CmdP and the nonvolatile memory controller BEP2 may be halted in step S202. In each ROM image, the code for basic operations of a processor is provided. By operating according to the downloaded ROM image, the nonvolatile memory controller BEP1 accesses the nonvolatile memory NVM1 for the booting image bootISP in step S206. In step S208, the nonvolatile memory controller BEP1 operates according to the successfully accessed booting image bootISP. In step S210, the nonvolatile memory controller BEP1 downloads the firmware image ISP1 and further transmits firmware images ISP2 and ISPC to the instruction storage space of the nonvolatile memory controller BEP2 and the command processor CmdP. The nonvolatile memory controller BEP1 then releases the halted nonvolatile memory controller BEP2 and the command processor CmdP. In step S212, each processor operates according to the loaded firmware image. The nonvolatile memory controller BEP1 operates according to the firmware image ISP1. The nonvolatile memory controller BEP2 operates according to the firmware image ISP2. The command processor CmdP operates according to the firmware image ISPC. In conclusion, the nonvolatile memory controller BEP1 is switched to an operational mode from a ROM mode. As for the command processor CmdP and the nonvolatile memory controller BEP2, these processors are switched to the operational mode when being released from a halted mode. The data storage device is successfully booted up.

When step S206 fails to download the booting image bootISP (e.g., prior to a card opening, and the booting image bootISP has not been stored in the nonvolatile memory NVM1), step S214 is performed. The nonvolatile memory controller BEP1 releases the halted nonvolatile memory controller BEP2 and the command processor CmdP. The processors operate according to the ROM images which have been downloaded in step S202 for basic operations. Therefore, the host 104 is allowed to provide and store the booting image bootISP and the firmware images ISP1, ISP2 and ISPC into the nonvolatile memory NVM1. In this manner, the required code images are prepared in the nonvolatile memory NVM1. The data storage device is reset in step S216 and steps S202 to S212 are performed to complete the booting scheme.

Figure 3A:
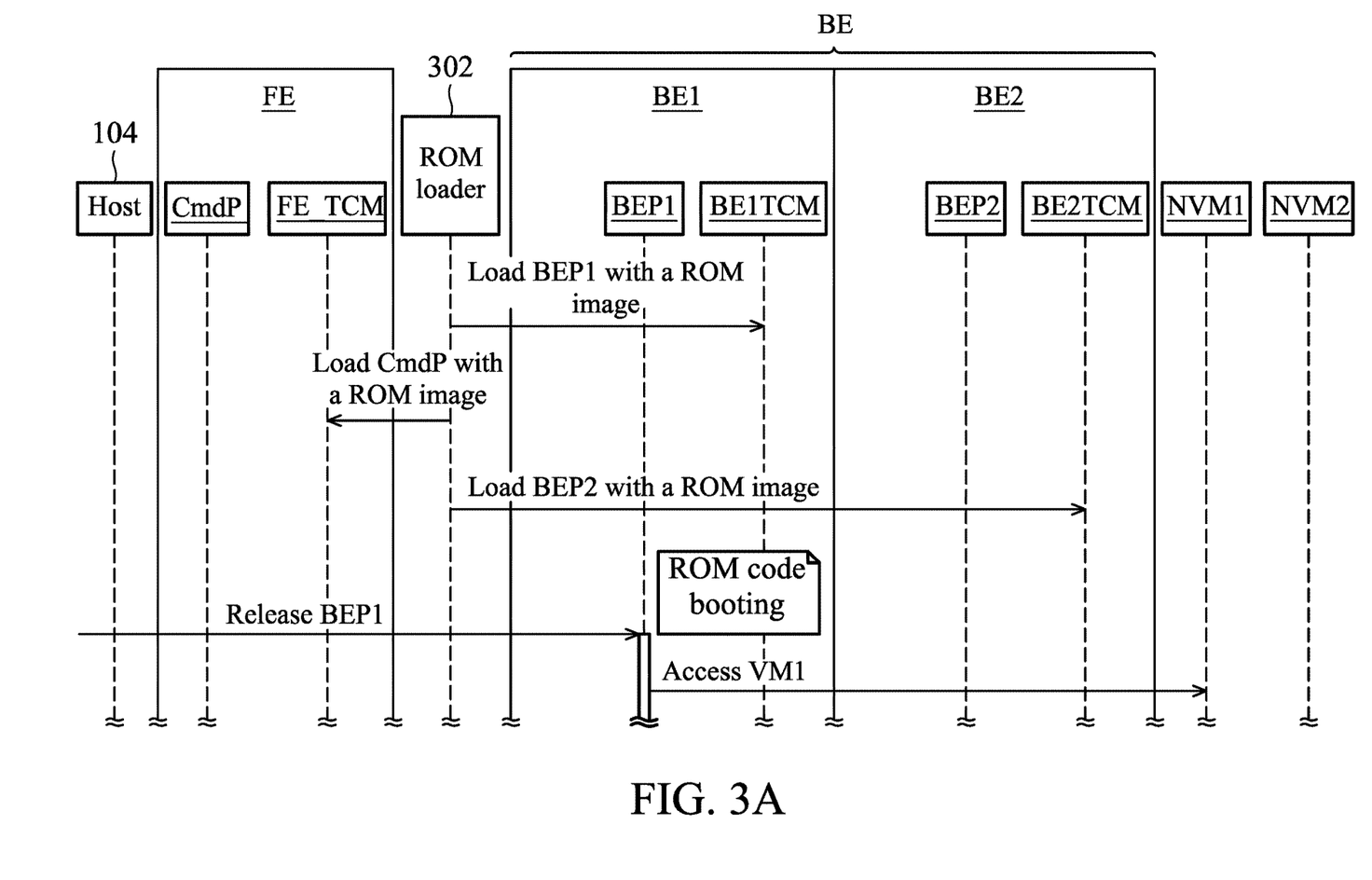
Figure 3B:
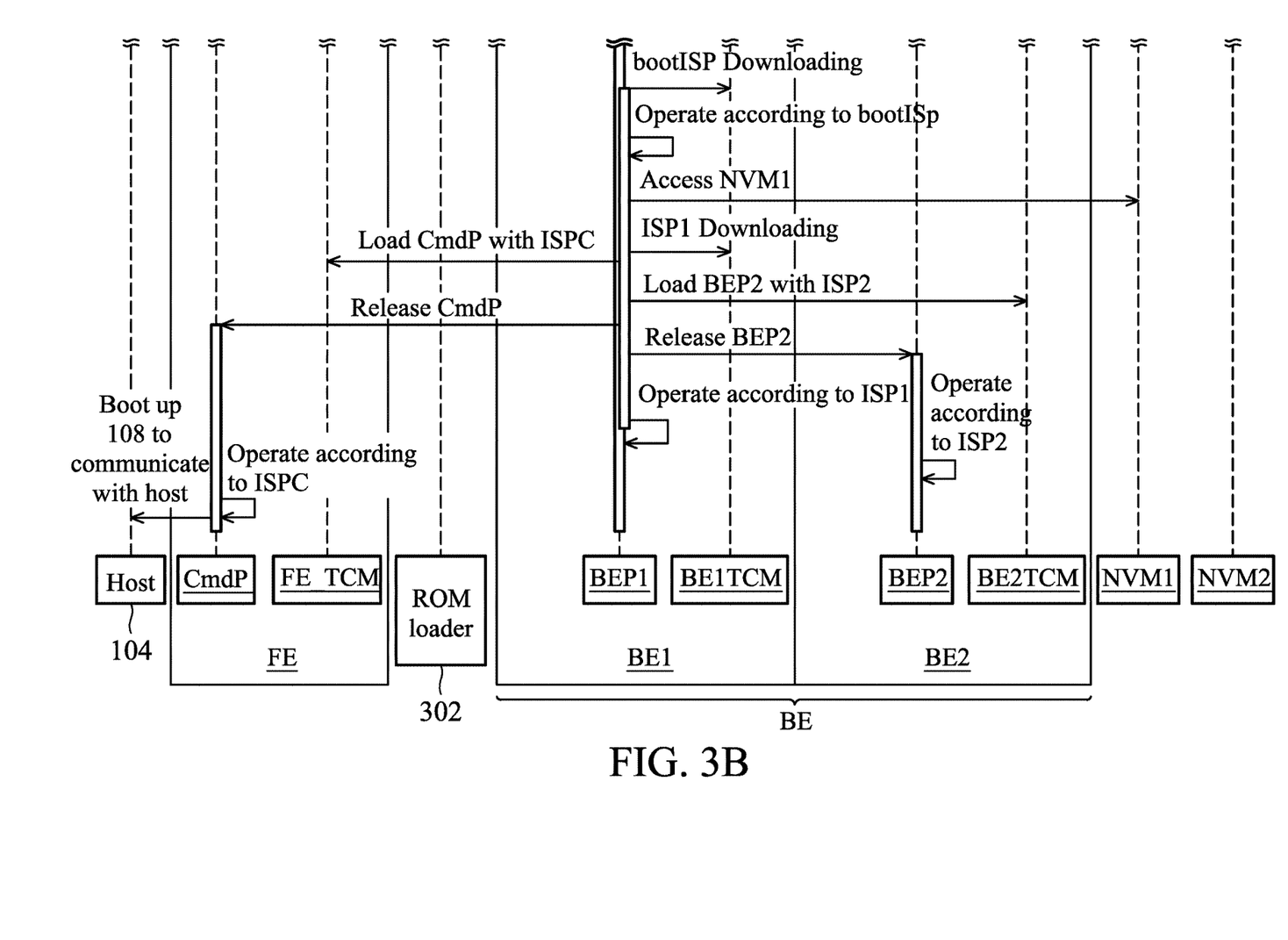
Figure 3C:
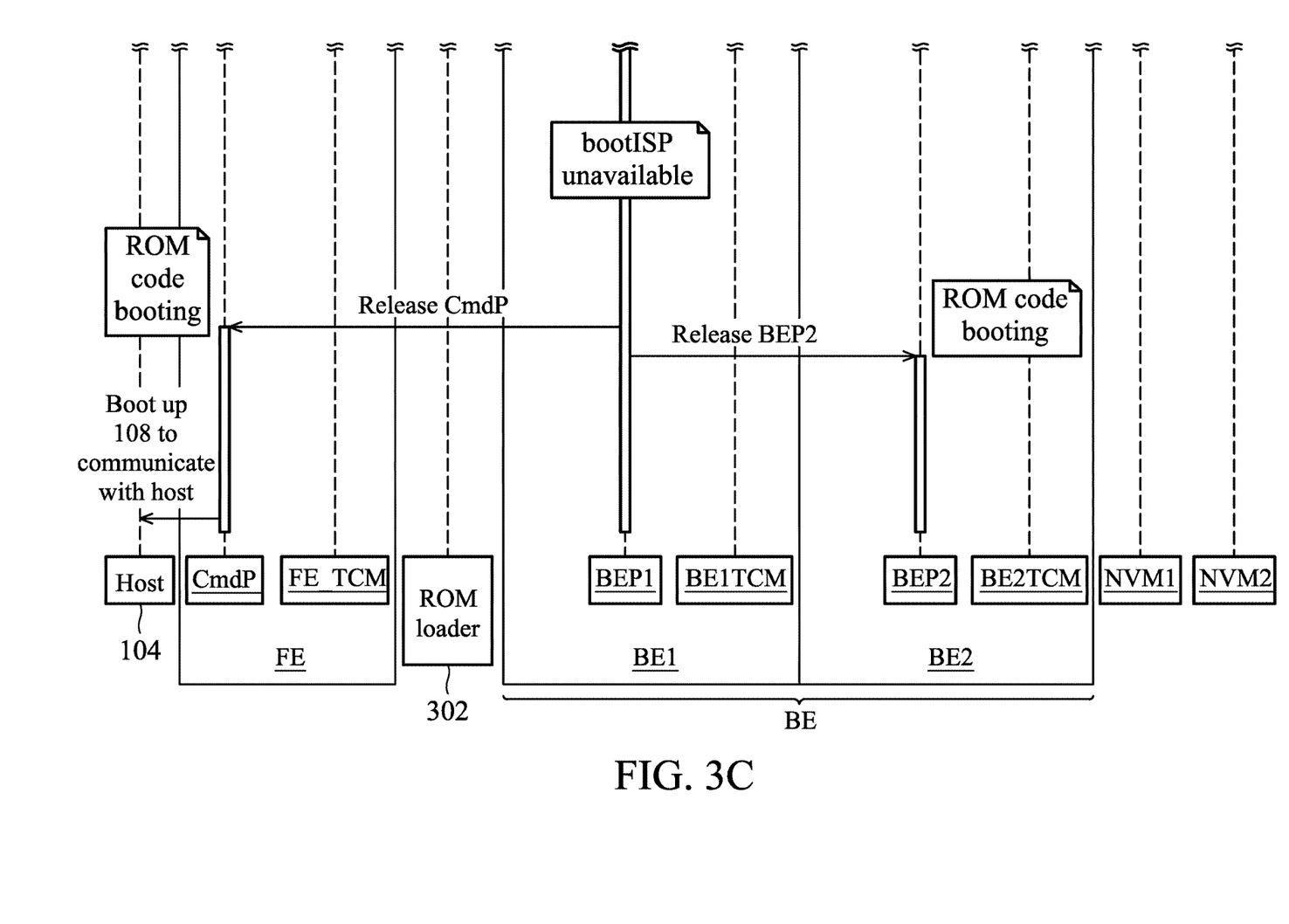

FIG. 3A to FIG. 3C are timing diagrams to help understand the booting scheme of FIG. 2. The command processor CmdP is provided at the front end FE with a temporary storage space labeled FE_TCM. The nonvolatile memory controller BEP1 for the nonvolatile memory NVM1 and the nonvolatile memory controller BEP2 for the nonvolatile memory NVM2 are provided at the back end BE. The nonvolatile memory controllers BEP1 and BEP2 may use tightly coupled memories BE1TCM and BE2TCM, respectively, for temporary storage of data or instructions. In other exemplary embodiments, the nonvolatile memory controllers BEP1 and BEP2 use DRAMs as the tightly coupled memories BE1TCM and BE2TCM. In the following discussion, the components at the back end BE for the nonvolatile memory NVM1 are marked by BE1, and the components at the back end BE for the nonvolatile memory NVM2 are marked by BE2.

In FIG. 3A to FIG. 3C, step S202 of FIG. 2 is performed by a hardware-implemented ROM loader 302. The ROM image for the nonvolatile memory controller BEP1 is downloaded to the tightly coupled memory BE1TCM. The ROM image for the command processor CmdP is downloaded to the tightly coupled memory FE_TCM. The ROM image for the nonvolatile memory controller BEP2 is downloaded to the tightly coupled memory BE2TCM. The ROM loader 302 may be separated in the different processors (including CmdP, BEP1 and BEP2). When the data storage device boots up, the ROM loader 302 operates till the ROM images are all downloaded from a ROM to the tightly coupled memories of the different processors. The processors BEP1, CmdP and BEP2 are halted in default. To boot up the nonvolatile memory controller BEP1 earlier than booting up the command processor CmdP and the nonvolatile memory controller BEP2, only the nonvolatile memory controller BEP1 is released from the halted status after the downloading of the ROM images. The released nonvolatile memory controller BEP1 operates according to the corresponding ROM image (S204) for booting up (ROM code booting). The released nonvolatile memory controller BEP1 accesses the nonvolatile memory NVM1 for a booting image bootISP. FIG. 3A is followed by FIG. 3B. After successfully downloading the booting image bootISP into the tightly coupled memory BE1TCM, the nonvolatile memory controller BEP1 operates according to the booting image bootISP (step S208) to access the nonvolatile memory NVM1 for the firmware images ISP1, ISP2 and ISPC. The nonvolatile memory controller BEP1 downloads the firmware image ISP1 to the tightly coupled memory BE1TCM, and downloads the firmware images ISPC and ISP2 to the tightly coupled memories FE_TCM and BE1TCM, respectively. The nonvolatile memory controller BEP1 then releases the command processor CmdP and the nonvolatile memory controller BEP2. Then, the processors BEP1, BEP2 and CmdP operate according to the downloaded firmware images ISP1, ISP2 and ISPC, respectively, for normal operations. The command processor CmdP further boots up the bus interface 106 and the instruction protocol controller 108 for communication between the data storage device and the host 104. Then, the booting scheme is done.

FIG. 3C following FIG. 3A is discussed with respect to step S214, wherein step S206 fails to download the booting image bootISP. When the booting image bootISP is not found in the nonvolatile memory NVM1, the nonvolatile memory controller BEP1 releases the command processor CmdP and the nonvolatile memory controller BEP2. The command processor CmdP and the nonvolatile memory controller BEP2 operate according to the downloaded ROM images to implement ROM code booting. The command processor CmdP further boots up the bus interface 106 and the instruction protocol controller 108 for communication between the data storage device and the host 104. The host 104 provides and stores the booting image bootISP and the firmware images ISP1, ISP2 and ISPC to the nonvolatile memory NVM1. Then, the data storage device is reset and the procedure of FIG. 3A is repeated and then according to FIG. 3B the booting scheme is completed.

In an exemplary embodiment, backup of the firmware images ISP1, ISP2 and ISPC are prepared in the nonvolatile memory NVM2. When the booting scheme dominated by nonvolatile memory controller BEP1 fails, the nonvolatile memory controller BEP1 may trigger the nonvolatile memory controller BEP2 to perform the booting scheme based on a similar concept.

Figure 4:
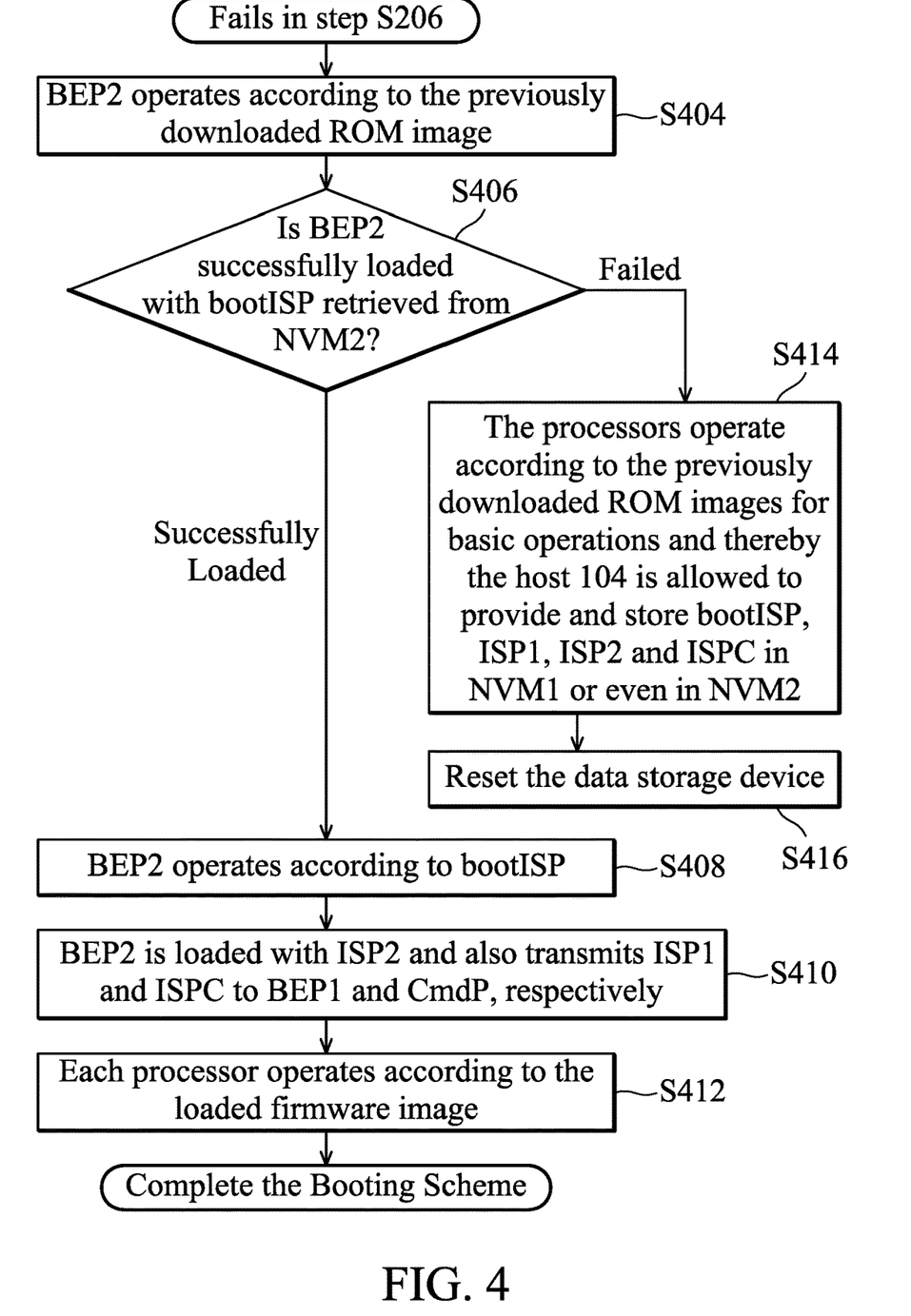
FIG. 4 is a flowchart depicting another solution for a failed downloading of the booting image bootISP in step S206.

FIG. 4 is a flowchart depicting another solution for failed downloading of the booting image bootISP in step S206. In step S404, the nonvolatile memory controller BEP2 operates according to the previously downloaded ROM image. In step S406, the nonvolatile memory controller BEP2 accesses the nonvolatile memory NVM2 to download the backup of the booting image bootISP. In step S408, the nonvolatile memory controller BEP2 operates according to the successfully downloaded booting image bootISP. In step S410, the nonvolatile memory controller BEP2 downloads the firmware image ISP2 and transmits the firmware images ISP1 and ISPC to the nonvolatile memory controller BEP1 and the command processor CmdP, respectively. In step S412, the different processors operate according to the downloaded firmware images. The nonvolatile memory controller BEP1 operates according to the firmware image ISP1. The nonvolatile memory controller BEP2 operates according to the firmware image ISP2. The command processor CmdP operates according to the firmware image ISPC. The data storage device boots up successfully.

When the booting image is still not available in step S406 (e.g. before a card opening scheme, no booting image bootISP in the nonvolatile memory NVM2), step S414 is performed. According to the previously downloaded ROM images, the processors operate to execute basic operations. Therefore, the host 104 is allowed to provide and store the booting image bootISP and the firmware images ISP1, ISP2 and ISPC into the nonvolatile memory NVM1 (or even into the nonvolatile memory NVM2 as a backup). The data storage device is reset in step S416 and steps S202 to S212 are performed to complete the booting scheme.

Figure 5:
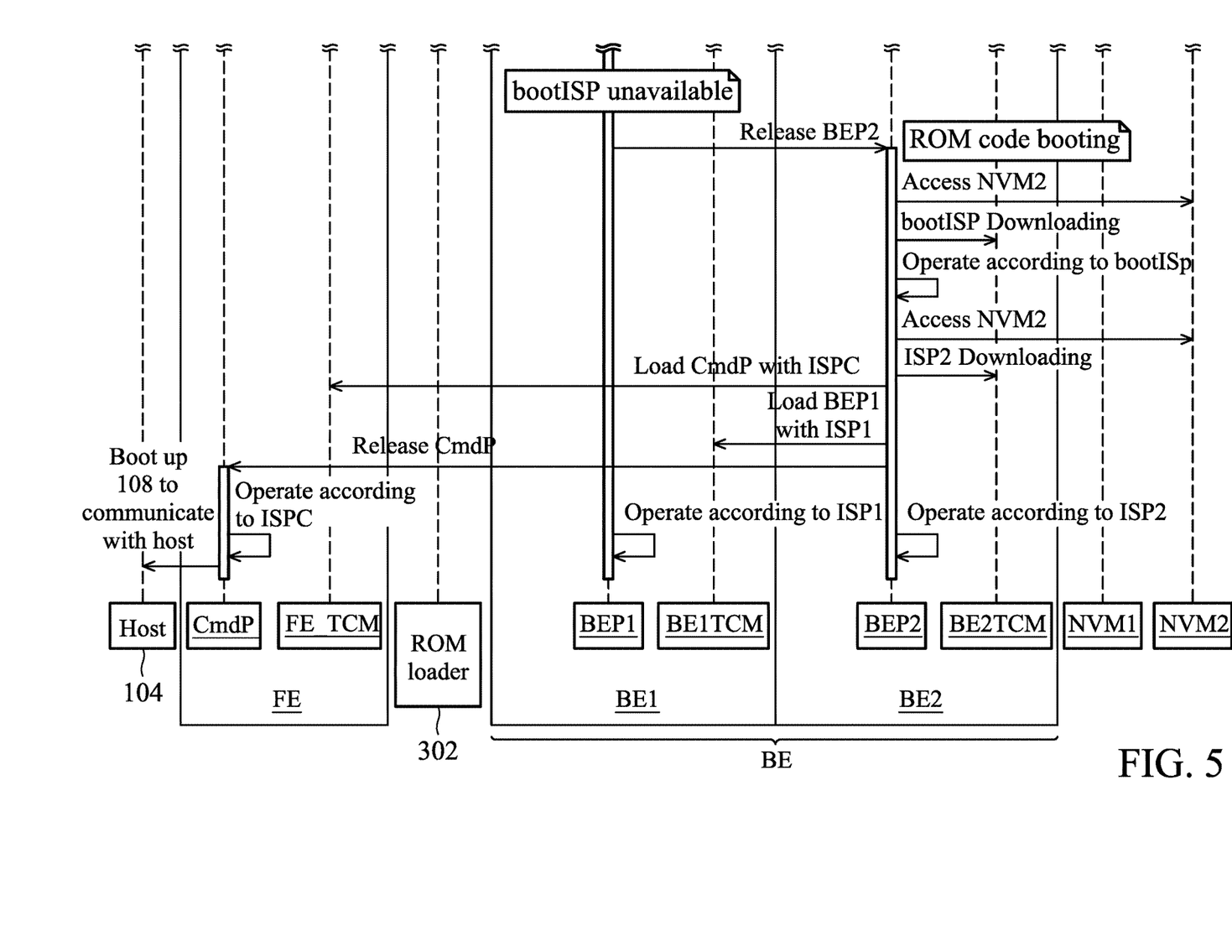
FIG. 5 is a timing diagram regarding the procedure taught in FIG. 4.

FIG. 5 is a timing diagram regarding the procedure taught in FIG. 4. A solution for failed downloading of the booting image bootISP in step S206f is introduced. The procedure of FIG. 5 follows that shown in FIG. 3A. When the booting image bootISP is not available, the nonvolatile memory controller BEP1 releases the nonvolatile memory controller BEP2. The nonvolatile memory controller BEP2 boots up according to the previously downloaded ROM image (step S404) and accesses the nonvolatile memory NVM2 to download the booting image bootISP (step S406). When the booting image bootISP is successfully downloaded to the tightly coupled memory BE2TCM, the nonvolatile memory controller BEP2 operates according to the booting image bootISP (step S408) to access the nonvolatile memory NVM2 for the firmware images ISP1, ISP2 and ISPC. The nonvolatile memory controller BEP2 downloads the firmware image ISP2 to the tightly coupled memory BE2TCM and downloads the firmware image ISPC to the tightly coupled memory FE_TCM and downloads the firmware image ISP1 to the tightly coupled memory BE1TCM. The nonvolatile memory controller BEP2 then releases the command processor CmdP. The processors BEP1, BEP2 and CmdP, therefore, normally operate according to the ISP images ISP1, ISP2 and ISPC, respectively. The command processor CmdP further boots up the bus interface 106 and the instruction protocol controller 108 and thereby the data storage device communicates with the host 104. The booting scheme therefore is completed.

The aforementioned booting scheme is suitable for two-layer control unit design (including a front end FE design and a back end BE design), and even quite easy to implement multiple nonvolatile memory controllers (including BEP1 and BEP2). Because the firmware images are stored in the nonvolatile memory, the space of EEPROM or ROM is saved. The centralized management of firmware images on one nonvolatile memory makes the firmware version management easy and correct. In an exemplary embodiment wherein the nonvolatile memories are flash memories, the firmware images are stored in SLCs (single layer cells) or MLCs (multiple layer cells)/TLCs (triple layer cells) operated in an SLC mode. Thus, firmware reliability is improved. In an exemplary embodiment, only one single processor (e.g. BEP1) dominates the booting scheme, which is relatively simple and does not need to communicate with the host 104.

Other techniques that use the aforementioned concepts to achieve the booting scheme are within the scope of the disclosure. Based on the above contents, the present invention further relates to methods for operating a data storage device.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A data storage device, comprising:
    a first nonvolatile memory; and
    a control unit in a two-layer control structure, using a command processor to communicate with a host and using a first nonvolatile memory controller to operate the first nonvolatile memory according to instructions transmitted from the command processor,
    wherein:
    earlier than the command processor operates according to a ROM image corresponding to the command processor, the first nonvolatile memory controller operates according to a ROM image corresponding to the first nonvolatile memory controller to access the first nonvolatile memory for a firmware image corresponding to the command processor and transmit the firmware image corresponding to the command processor to the command processor.

2. The data storage device as claimed in claim 1, wherein:
    according to the ROM image corresponding to the first nonvolatile memory controller, the first nonvolatile memory controller accesses the first nonvolatile memory for a booting image; and
    the first nonvolatile memory controller operates according to the booting image and thereby accesses the first nonvolatile memory for the firmware image corresponding to the command processor.

3. The data storage device as claimed in claim 2, wherein:
    according to the booting image, the first nonvolatile memory controller accesses the first nonvolatile memory for a firmware image corresponding to the first nonvolatile memory controller.

4. The data storage device as claimed in claim 3, wherein:
    when the first nonvolatile memory controller fails to get the booting image from the first nonvolatile memory, the command processor operates according to the ROM image corresponding to the command processor to communicate with the host to get and store the booting image, the firmware image corresponding to the command processor, and the firmware image corresponding to the first nonvolatile memory controller in the first nonvolatile memory.

5. The data storage device as claimed in claim 4, wherein:
    the first nonvolatile memory is a flash memory; and
    the booting image, the firmware image corresponding to the command processor, and the firmware image corresponding to the first nonvolatile memory controller obtained from the host are stored in single layer cells of the flash memory.

6. The data storage device as claimed in claim 3, further comprising a second nonvolatile memory, wherein:
    the control unit further includes a second nonvolatile memory controller operating the second nonvolatile memory;
    earlier than the second nonvolatile memory controller operates according to a ROM image corresponding to the second nonvolatile memory controller, the first nonvolatile memory controller operates according to the ROM image corresponding to the first nonvolatile memory controller to access the first nonvolatile memory for a firmware image corresponding to the second nonvolatile memory controller and transmit the firmware image corresponding to the second nonvolatile memory controller to the second nonvolatile memory controller.

7. The data storage device as claimed in claim 6, wherein:
    the first nonvolatile memory accesses the first nonvolatile memory for the firmware image corresponding to the second nonvolatile memory controller according to the booting image.

8. The data storage device as claimed in claim 7, wherein:
    when the first nonvolatile memory controller fails to get the booting image from the first nonvolatile memory, the second nonvolatile memory controller operates according to the ROM image corresponding to the second nonvolatile memory controller to access the second nonvolatile memory for the booting image;

the second volatile memory controller operates according to the booting image to access the second nonvolatile memory for the firmware image corresponding to the second nonvolatile memory controller, the firmware image corresponding to the first nonvolatile memory controller, and the firmware image corresponding to the command processor; and the second volatile memory controller loads the first nonvolatile memory controller with the firmware image corresponding to the first nonvolatile memory controller, and loads the command processor with the firmware image corresponding to the command processor.

9. The data storage device as claimed in claim 8, wherein:

when the second nonvolatile memory controller fails to get the booting image from the second nonvolatile memory, the command processor operates according to the ROM image corresponding to the command processor to communicate with the host to get and store the booting image, the firmware image corresponding to the command processor, and the firmware images corresponding to the first and second nonvolatile memory controllers to the first and second nonvolatile memories.

10. The data storage device as claimed in claim 9, wherein:

the first and second nonvolatile memories are flash memories; and the booting image, the firmware image corresponding to the command processor, and the firmware images corresponding to the first and second nonvolatile memory controllers obtained from the host are stored in single layer cells of the flash memories.

11. A method for operating a data storage device, comprising:

using a command processor to communicate with a host; and using a first nonvolatile memory controller to operate a first nonvolatile memory, wherein:

earlier than the command processor operates according to a ROM image corresponding to the command processor, the first nonvolatile memory controller operates according to a ROM image corresponding to the first nonvolatile memory controller to access the first nonvolatile memory for a firmware image corresponding to the command processor and transmit the firmware image corresponding to the command processor to the command processor.

12. The method as claimed in claim 11, wherein:

according to the ROM image corresponding to the first nonvolatile memory controller, the first nonvolatile memory controller accesses the first nonvolatile memory for a booting image; and the first nonvolatile memory controller operates according to the booting image and thereby accesses the first nonvolatile memory for the firmware image corresponding to the command processor.

13. The method as claimed in claim 12, wherein:

according to the booting image, the first nonvolatile memory controller further accesses the first nonvolatile memory for a firmware image corresponding to the first nonvolatile memory controller.

14. The method as claimed in claim 13, wherein:

when the first nonvolatile memory controller fails to get the booting image from the first nonvolatile memory, the command processor operates according to the ROM image corresponding to the command processor to communicate with the host to get and store the booting image, the firmware image corresponding to the command processor, and the firmware image corresponding to the first nonvolatile memory controller to the first nonvolatile memory.

15. The method as claimed in claim 14, wherein:

the first nonvolatile memory is a flash memory; and the booting image, the firmware image corresponding to the command processor, and the firmware image corresponding to the first nonvolatile memory controller obtained from the host are stored in single layer cells of the flash memory.

16. The method as claimed in claim 13, further comprising:

using a second nonvolatile memory controller to operate a second nonvolatile memory;

wherein, earlier than the second nonvolatile memory controller operates according to a ROM image corresponding to the second nonvolatile memory controller, the first nonvolatile memory controller operates according to the ROM image corresponding to the first nonvolatile memory controller to access the first nonvolatile memory for a firmware image corresponding to the second nonvolatile memory controller and transmit the firmware image corresponding to the second nonvolatile memory controller to the second nonvolatile memory controller.

17. The method as claimed in claim 16, wherein:

the first nonvolatile memory accesses the first nonvolatile memory for the firmware image corresponding to the second nonvolatile memory controller according to the booting image.

18. The method as claimed in claim 17, wherein:

when the first nonvolatile memory controller fails to get the booting image from the first nonvolatile memory, the second nonvolatile memory controller operates according to the ROM image corresponding to the second nonvolatile memory controller to access the second nonvolatile memory for the booting image;

the second volatile memory controller operates according to the booting image to access the second nonvolatile memory for the firmware image corresponding to the second nonvolatile memory controller, the firmware image corresponding to the first nonvolatile memory controller, and the firmware image corresponding to the command processor; and the second volatile memory controller further loads the first nonvolatile memory controller with the firmware image corresponding to the first nonvolatile memory controller, and loads the command processor with the firmware image corresponding to the command processor.

19. The method as claimed in claim 18, wherein:

when the second nonvolatile memory controller fails to get the booting image from the second nonvolatile memory, the command processor operates according to the ROM image corresponding to the command processor to communicate with the host to get and store the booting image, the firmware image corresponding to the command processor, and the firmware images corresponding to the first and second nonvolatile memory controllers to the first and second nonvolatile memories.

20. The method as claimed in claim 19, wherein:
the first and second nonvolatile memories are flash memories; and
the booting image, the firmware image corresponding to the command processor, and the firmware images corresponding to the first and second nonvolatile memory controllers obtained from the host are stored in single layer cells of the flash memories.

21. A data storage device, comprising:
a nonvolatile memory;
a command processor, communicating with a host; and
a nonvolatile memory controller, operating the nonvolatile memory according to instructions from the command processor,
wherein:
the controller corresponds to a ROM image;
the command processor operates according to a firmware image provided from the nonvolatile memory controller rather than according to the ROM image of the command processor; and
the nonvolatile memory controller accesses the nonvolatile memory to get the firmware image for the command processor.

22. The data storage device as claimed in claim 21, wherein:
before receiving the instructions, the nonvolatile memory controller automatically provides the command processor with the firmware image retrieved from the nonvolatile memory.

23. The data storage device as claimed in claim 21, wherein:
the nonvolatile memory controller operates according to a ROM image corresponding to the nonvolatile memory controller to get the firmware image from the nonvolatile memory and loads the command processor with the firmware image.

* * * * *